(12) United States Patent
Kang et al.

(10) Patent No.: US 9,447,233 B2
(45) Date of Patent: *Sep. 20, 2016

(54) METHOD FOR CONTINUOUS PRODUCTION OF BIODEGRADABLE ALIPHATIC/AROMATIC POLYESTER COPOLYMER

(71) Applicants: LOTTE FINE CHEMICAL CO., LTD., Ulsan (KR); S-ENPOL CO., LTD., Wonju-si (KR)

(72) Inventors: Gyung Don Kang, Daejeon (KR); Ki Chull Yun, Cheonan-si (KR); Sang Yob Kim, Goyang-si (KR); Kil Seuk Byun, Yongin-si (KR); Jung Ryum, Seoul (KR); Boo Seong Kim, Seoul (KR); Sei Hoon Kim, Wonju-si (KR); Sung Bae Park, Incheon (KR)

(73) Assignees: LOTTE FINE CHEMICAL CO., LTD. (KR); S-ENPOL CO., LTD. (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/651,663

(22) PCT Filed: Jul. 18, 2013

(86) PCT No.: PCT/KR2013/006433
§ 371 (c)(1),
(2) Date: Jun. 11, 2015

(87) PCT Pub. No.: WO2014/092277
PCT Pub. Date: Jun. 19, 2014

(65) Prior Publication Data
US 2015/0315335 A1    Nov. 5, 2015

(30) Foreign Application Priority Data

Dec. 12, 2012  (KR) .................. 10-2012-0144805

(51) Int. Cl.
| | |
|---|---|
| C08G 63/02 | (2006.01) |
| C08G 63/91 | (2006.01) |
| C08G 63/16 | (2006.01) |
| C08G 63/78 | (2006.01) |
| C08L 67/02 | (2006.01) |

(52) U.S. Cl.
CPC ............ *C08G 63/916* (2013.01); *C08G 63/16* (2013.01); *C08G 63/78* (2013.01); *C08L 67/02* (2013.01)

(58) Field of Classification Search
CPC .............................. C08G 63/85; C08G 63/82
USPC ........................................ 528/271, 272, 279
See application file for complete search history.

(56) References Cited

U.S. PATENT DOCUMENTS

| | | | |
|---|---|---|---|
| 5,786,443 A | 7/1998 | Lowe | |
| 2006/0142536 A1 | 6/2006 | Chen et al. | |
| 2010/0305297 A1 | 12/2010 | Hoshino et al. | |
| 2011/0306710 A1 | 12/2011 | Odorisio et al. | |
| 2015/0315334 A1* | 11/2015 | Kang | C08G 63/16 525/448 |
| 2015/0397657 * | 11/2015 | Kang | C08G 63/16 525/448 |

FOREIGN PATENT DOCUMENTS

| | | |
|---|---|---|
| CN | 102558616 A | 7/2012 |
| KR | 1019990009593 | 2/1999 |
| KR | 1020030068162 | 8/2003 |
| KR | 1020050075926 | 7/2005 |
| KR | 10-0701622 B1 | 3/2007 |
| KR | 1020100108528 | 10/2010 |
| KR | 10-2011-007185 A | 1/2011 |
| KR | 1020110007186 | 1/2011 |
| KR | 10-1097172 B1 | 12/2011 |

(Continued)

OTHER PUBLICATIONS

"Simulation for fermentor design", Copyright 1994, 2015, Retrieved Jun. 11, 2015, <http://www.hitachi-pt.com/products/ip/element_technology/simulation.html>.
"HADO", Copyright 2010, Retrieved from the Internet Jun. 10, 2015, <URL:http://www.hado.co.kr/default1.html>.
International Search Report—PCT/KR2013/006433 dated Oct. 7, 2013.
Written Opinion—PCT/KR2013/006433 dated Oct. 7, 2013.
State Intellectual Property Office of the People's Republic of China, Office Action dated Feb. 3, 2016 for corresponding Chinese Application No. 20138006489.4 (7 pages).

(Continued)

*Primary Examiner* — Terressa Boykin
(74) *Attorney, Agent, or Firm* — Fitch Even Tabin & Flannery LLP

(57) ABSTRACT

A continuous preparation method of a biodegradable aliphatic/aromatic polyester copolymer includes: performing a first esterification reaction of an aliphatic dihydroxy compound with an aliphatic dicarboxylic acid at a temperature of 185° C. or less; continuously performing a second esterification reaction of a reaction product from the first esterification reaction; continuously performing a first polycondensation reaction of a reaction product from the second esterification reaction to obtain a prepolymer having a weight average molecular weight of about 6,900 to about 14,000; continuously performing a second polycondensation reaction of the prepolymer to obtain a second polycondensation reaction product; and continuously performing a third polycondensation reaction of the second polycondensation reaction product to prepare the biodegradable aliphatic/aromatic polyester copolymer, wherein the performing of the first esterification reaction or the continuously performing of the second esterification reaction includes adding an aromatic carboxylic acid. The biodegradable aliphatic/aromatic polyester copolymer prepared by the continuous method may be improved in processibility, film formability, tensile/tearing strength, and blending ability with another polymer resin. Use of a less amount of the aliphatic dihydroxy compound as a starting material may reduce manufacturing costs.

10 Claims, No Drawings

(56) References Cited

FOREIGN PATENT DOCUMENTS

| KR | 1020120101387 | 9/2012 |
| KR | 10-1200824 B1 | 11/2012 |
| WO | 2009084443 | 7/2009 |
| WO | 2009/127556 A1 | 10/2009 |
| WO | 2009127555 | 10/2009 |
| WO | 2011045293 | 4/2011 |
| WO | 2012007958 | 1/2012 |

* cited by examiner

METHOD FOR CONTINUOUS PRODUCTION OF BIODEGRADABLE ALIPHATIC/AROMATIC POLYESTER COPOLYMER

TECHNICAL FIELD

The present invention relates to a continuous preparation method of a biodegradable aliphatic/aromatic polyester copolymer, and more particularly, to a method of continuously preparing a biodegradable aliphatic/aromatic polyester copolymer by using an aliphatic dicarboxylic acid, an aromatic dicarboxylic acid, and an aliphatic dihydroxy compound.

BACKGROUND ART

With recognition of conventional non-degradable plastics, such as nylon, polyethylene terephthalate, polypropylene, and polyethylene, as a primary cause of environmental pollutions, biodegradable polyesters have been on the spotlight for environmental protection purposes. Biodegradable polyesters may be prepared by a batch production method or a continuous production method.

In the batch production method, a relatively long time that a reaction mixture spends in a reactor at a high temperature is needed to achieve an intrinsic viscosity and a molecular weight of a target polyester; a partially heterogeneous reaction may occur even in the reactor; and physical properties of the polyester may be changed at the initial, intermediate, and latter stages of a discharge process even after the completion of the reaction. In this regard, when a biodegradable polyester spends at a high temperature for a long period of time, the biodegradable polyester may be hydrolyzed by heat, which may affect mechanical strength and hydrolysis-resistant properties of the biodegradable polyester and may cause a difference in quality due to the partially heterogeneous reactions and different discharge times.

Meanwhile, the continuous production method may suppress the hydrolysis of biodegradable polyesters caused by heat generated in the batch production method. The continuous production method is appropriate for mass production and to continuously obtain products with a uniform quality.

In general, diols such as 1,4-butanediol may be used as aliphatic dihydroxy compounds to prepare biodegradable polyesters. However, 1,4-butanediol may be changed into tetrahydrofuran during a reaction, frequently causing troubles in a vacuum line of a manufacturing system. Furthermore, such 1,4-butanediol is required in excess amount. Therefore, there are needs for improvements in this regard.

DETAILED DESCRIPTION OF THE INVENTION

Technical Problem

The present invention provides a method of continuously preparing a biodegradable aliphatic/aromatic polyester copolymer.

Technical Solution

Additional aspects will be set forth in part in the description which follows and, in part, will be apparent from the description, or may be learned by practice of the presented embodiments.

According to an aspect of the present invention, there is provided a continuous preparation method of a biodegradable aliphatic/aromatic polyester copolymer, the method including: performing a first esterification reaction of an aliphatic dihydroxy compound with an aliphatic dicarboxylic acid at a temperature of 185° C. or less; continuously performing a second esterification reaction of a reaction product from the first esterification reaction; continuously performing a first polycondensation reaction of a reaction product from the second esterification reaction to obtain a prepolymer having a weight average molecular weight of about 6,900 to about 14,000; continuously performing a second polycondensation reaction of the prepolymer to obtain a second polycondensation reaction product; and continuously performing a third polycondensation reaction of the second polycondensation reaction product to prepare the biodegradable aliphatic/aromatic polyester copolymer, wherein the performing of the first esterification reaction or the continuously performing of the second esterification reaction includes adding an aromatic carboxylic acid.

Advantageous Effects

According to the one or more embodiments of the present invention, a biodegradable aliphatic/aromatic polyester copolymer improved in processibility, film formability, tensile/tearing strength, and blending ability with another polymer resin may be obtained by adjustment of weight average molecular weights of a first polycondensation reaction product and a second polycondensation reaction product. A less amount of 1,4-butanediol than that used in conventional methods may be used due to suppressed side reaction thereof, and consequentially an amount of 1,4-butanediol further added during preparation may also be reduced. Thus, manufacturing costs of the biodegradable aliphatic/aromatic polyester copolymer may be reduced. In addition, reduced emission of THF may be good for environmental protection. Therefore, the biodegradable aliphatic polyester may be prepared through continuous processes at a mass scale.

MODE OF THE INVENTION

As used herein, the term "and/or" includes any and all combinations of one or more of the associated listed items. Expressions such as "at least one of," when preceding a list of elements, modify the entire list of elements and do not modify the individual elements of the list.

According to an aspect of the present invention, a continuous preparation method of a biodegradable aliphatic/aromatic polyester copolymer includes: performing a first esterification reaction of an aliphatic dihydroxy compound with an aliphatic dicarboxylic acid at a temperature of 185° C. or less; continuously performing a second esterification reaction of a reaction product from the first esterification reaction; continuously performing a first polycondensation reaction of a reaction product from the second esterification reaction to obtain a prepolymer, and continuously performing a polycondensation reaction of the prepolymer. The continuously performing of the polycondensation reaction of the prepolymer may includes continuously performing a second polycondensation reaction of the prepolymer and continuously performing a third polycondensation reaction of a reaction product from the second polycondensation reaction. The prepolymer from the first polycondensation reaction may have a weight average molecular weight of about 6,900 to about 14,000.

When the prepolymer from the first polycondensation reaction has a weight average molecular weight greater than 14,000, depolymerization may occur during the second polycondensation reaction and the third polycondensation reaction to increase an acid value of the reaction product, and deteriorate a color of the reaction product. When the prepolymer from the first polycondensation reaction has a weight average molecular weight smaller than 6,900, reaction conditions for the second polycondensation reaction and the third polycondensation reaction may need to be varied, for example, to increase a time that a reaction mixture spends in the reactor for the second and third polycondensation reactions (hereinafter, referred to as a reaction mixture residence time or a residence time), a reaction temperature, and a stirring speed.

The second polycondensation reaction product from the continuous second polycondensation reaction of the prepolymer may have a weight average molecular weight of about 50,000 to about 80,000.

When the weight average molecular weight of the second polycondensation reaction product is within this range, the third polycondensation reactivity of the second polycondensation reaction product may be high to obtain a biodegradable aliphatic/aromatic polyester copolymer with improvements in processability, film formability, tensile/tearing strength, and blending ability with another polymer resin. To control the weight average molecular weights of the first polycondensation reaction product and the second polycondensation reaction product within the above ranges, reaction conditions for the first esterification reaction, the second esterification reaction, the first polycondensation reaction, and the second polycondensation reaction, for example, in terms of polycondensation temperature, reaction mixture residence time, degree of vacuum, and flow rate, are very important. These reaction conductions will be described later in greater detail.

The reaction product from the continuous third polycondensation reaction, i.e., the biodegradable aliphatic/aromatic polyester copolymer, may have a weight average molecular weight of about 120,000 to about 170,000.

When the weight average molecular weight of the biodegradable aliphatic/aromatic polyester copolymer is within this range, the biodegradable aliphatic/aromatic polyester copolymer may be improved in processability, film formability, tensile/tearing strength, and blending ability with another polymer resin.

To control the weight average molecular weight of the third polycondensation reaction product within the above range, reaction conditions for the third polycondensation reaction, for example, in terms of reaction temperature, reaction mixture residence time, degree of vacuum, and flow rate, are very important. These reaction conditions will be described later in greater detail.

In the performing of the first esterification reaction or the continuously performing of the second esterification reaction, an aromatic carboxylic acid may be added.

The term "esterification reaction" used herein refers to not only an esterification reaction of a dihydroxy compound with dicarboxylic acid, but also a trans-esterification reaction thereof.

As described above, esterification reaction may include a first esterification reaction performed at a temperature of 185° C. or less to obtain an aliphatic oligomer, and a second esterification reaction performed at a temperature from about 220 to about 250° C. to obtain an aliphatic/aromatic oligomer.

The first esterification reaction of the aliphatic dihydroxy compound with aliphatic dicarboxylic acid is performed at a temperature of 185° C. or less to effectively inhibit a side reaction by which the aliphatic dihydroxy compound, for example, 1,4-butanediol, as a starting material, may be converted into tetrahydrofuran (THF).

The conversion of 1,4-butanediol to THF may highly occur at a temperature of about 190° C. or higher under acidic conditions. The reaction temperature of the first esterification reaction may be adjusted to 185° C. or less to inhibit and minimize the conversion of 1,4-butanediol into THF as much as possible. Thus, the amount of 1,4-butanediol required for preparing the biodegradable aliphatic/aromatic polyester copolymer is significantly reduced compared to conventional methods, and consequentially manufacturing costs of the biodegradable polyester are reduced.

The disclosed method is suitable for environmental protection purposes because generation of a byproduct such as THF is inhibited, thereby reducing troubles in a vacuum line of a manufacturing system caused by the byproduct, and consequentially improving workability and manufacturing efficiency.

The reaction temperature of the first esterification reaction may be in the range of about 160 to about 185° C., for example, about 180° C.

The first esterification reaction may be performed in a batch reactor. In some other embodiments, the first esterification reaction may be performed as a continuous process while providing a mixture of the aliphatic dihydroxy compound and aliphatic dicarboxylic acid to the first esterification reactor.

To catalyze the first esterification reaction of the aliphatic dihydroxy compound with aliphatic dicarboxylic acid, a catalyst may be added into the mixture of the aliphatic dihydroxy compound and aliphatic dicarboxylic acid.

The second esterification reaction, which is an esterification reaction of the aromatic dicarboxylic acid and the aliphatic oligomer obtained from the first esterification reaction, may be performed at a temperature from about 220° C. to about 250° C. that is higher than the temperature of the first esterification reaction, to obtain a target product.

Examples of the aliphatic dihydroxy compound may include $C_2$-$C_{30}$ alkanediol, such as ethanediol, 1,2-propanediol, 1,3-propanediol, 1,2-butanediol, 1,4-butanediol, 1,5-pentanediol, 1,6-hexanediol, 2,4-dimethyl-2-ethyl-1,3-hexanediol, 2,2-dimethyl-1,3-propanediol, 2-ethyl-2-butyl-1,3-propanediol, 2-ethyl-2-isobutyl-1,3-propanediol, 2,2,4-trimethyl-1,6-hexanediol, or a mixture thereof.

Examples of the aliphatic dicarboxylic acid may include a $C_2$-$C_{30}$ aliphatic acid, for example, a $C_4$-$C_{14}$ aliphatic acid and derivatives thereof, which may be a linear or a branched acid.

An example of the aliphatic dicarboxylic acid may be a $C_7$-$C_{30}$ cycloaliphatic dicarboxylic acid.

Examples of the aliphatic dicarboxylic acid may include malonic acid, succinic acid, glutaric acid, 2-methylglutaric acid, 3-methylglutaric acid, adipic acid, pimellic acid, suberic acid, azelaic acid, sebacic acid, undecanedioic acid, dodecanedioic acid, brassylic acid, tetradecanedioic acid, furmaric acid, 2,2-dimethylglutaric acid, maleic acid, itaconic acid, or a mixture thereof.

Examples of the aromatic dicarboxylic acid may include a $C_8$-$C_{30}$ aromatic dicarboxylic acid, such as terephthalic acid, isophthalic acid, 2,6-naphthoic acid, 1,5-naphthoic acid, or a mixture thereof.

A total amount of the aliphatic dihydroxy compound used in the first esterification reaction and second esterification reaction may be in a range of about 1.1 to about 1.5 moles based on 1 mole of a total amount of the aliphatic dicarboxylic acid and the aromatic dicarboxylic acid. Thus, a production yield of the oligomer may be high even with the use of a smaller amount of the aliphatic dihyroxy compound compared to conventional methods in which an amount of the aliphatic dihydroxy compound used is 2 moles or more based on 1 mole of a total amount of aliphatic dicarboxylic acid and aromatic dicarboxylic acid.

In the first esterification reaction, an amount of used aliphatic dicarboxylic acid may be from about 30 mol % to about 99 mol % based on a total mole of dicarboxylic acid.

An amount of the used aromatic dicarboxylic acid may be in a range of about 1 mol % to about 70 mol % based on a total mole of the used dicarboxylic acid. A total amount of aliphatic dicarboxylic acid and aromatic dicarboxylic acid is set to be 100 mol %. In the mixture of the aliphatic dihydroxy compound and aliphatic dicarboxylic acid, at least one selected from a catalyst, a heat stabilizer, a branching agent, a color stabilizing agent, and a color control agent may be further added thereto.

An example of the catalyst may be a compound at least one metal selected from lithium, magnesium, calcium, barium, cerium, titanium, zirconium, hafnium, vanadium, manganese, iron, cobalt, iridium, nickel, zinc, and tin.

Examples of the metal-containing compound may include a metal organic acid salt, a metal alkoxide, a metal complex, a metal oxide, a metal hydroxide, a metal carbonate, a metal phosphate, a metal sulfate, a metal nitrate, or a metal chloride.

An example of the catalyst may be tetra-n-butyl titanate or tetra-n-isopropyl titanate.

The catalyst may be used in an amount in a range of about 0.00001 to about 0.2 moles based on 1 mole of dicarboxylic acid. When the amount of the catalyst used is within this range, a yield of the product of the first esterification reaction may be high. When the amount of the catalyst is less than about 0.00001 mole, a reaction rate may be low. On the other hand, when the amount of the catalyst used is more than about 0.2 mole, a rate of depolymerization may be accelerated in the end of polycondensation reaction, and thus failing to achieve a target degree of polymerization may not be obtained, and resulting in reduced tensile strength/internal tearing strength, and reduced chromaticity.

As the branching agent, a compound including at least three groups for esterification selected from a carboxyl group, a hydroxyl group, and an amine group may be used. Examples of the branching agent may include trimellitic acid, citric acid, maleic acid, glycerol, monosaccharide, disaccharide, dextrin, or a reduced sugar.

When the branching agent is used, the biodegradable polyester copolymer of a high molecular weight may be easily prepared, but due to a wide distribution of molecular weights, the tensile strength/internal tearing strength may be reduced. Accordingly, the amount of the branching agent may be appropriately controlled in this regard.

The amount of the branching agent may be in the range of about 0.00001 to about 0.2 mole based on 1 mole of dicarboxylic acid. When the amount of the branching agent is within this range, a biodegradable aliphatic/aromatic polyester copolymer having a high molecular weight with improved tensile strength/internal tearing strength may be obtained.

Examples of the color stabilizing agent may include phosphoric acid, phosphorous acid, triphenylphosphite, triphenylphosphate, trimethylphosphate, triethylphosphate, sodium hypophosphite, or sodium phosphonate. An amount of the color stabilizing agent may be in the range of about 0.00001 to about 0.2 mole based on 1 mole of dicarboxylic acid.

An example of the color control agent may be cobalt acetate.

The first polycondensation reaction (also referred to as a pre-polycondensation) of a reaction product obtained from the second esterification reaction may be continuously performed to obtain a prepolymer.

A catalyst may be further added into the reaction mixture to catalyze the first polycondensation reaction. In some embodiments, at least one selected from a catalyst and a stabilizer may be further added into the reaction mixture.

The step of continuously performing polycondensation reaction of the prepolymer obtained from the first polycondensation reaction may be performed in multiple steps. For example, the multiples steps may include continuously performing the second polycondensation reaction of the prepolymer and continuously performing the third polycondensation reaction of the product obtained from the second polycondensation reaction.

In regard to the method of the present invention, even when no or a small amount of a chain extender is used, a target biodegradable aliphatic/aromatic polyester copolymer having a large molecular weight may be prepared.

According to embodiments of the present invention, the biodegradable aliphatic/aromatic polyester copolymer may include a first repeat unit represented by Formula 1 and a second repeat unit represented by Formula 2. A weight average molecular weight of the copolymer may be, for example, in a range of about 120,000 to about 170,000.

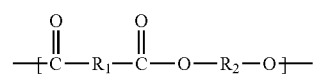

[Formula 1]

In Formula 1, $R_1$ and $R_2$ may be each independently a divalent $C_1$-$C_{30}$ aliphatic hydrocarbon group.

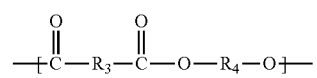

[Formula 2]

In Formula 2, $R_3$ may be a divalent $C_6$-$C_{30}$ aromatic hydrocarbon group, and $R_4$ may be a divalent $C_1$-$C_{30}$ aliphatic hydrocarbon group.

The copolymer may be an alternating copolymer, a random copolymer, or a block copolymer.

In Formula 1, $R_1$ and $R_2$ may be each independently ethylene, propylene, or butylene. In Formula 2, $R_3$ may be a phenylene group, and $R_4$ may be ethylene, propylene, or butylene.

The aliphatic/aromatic polyester copolymer may be a polymer having a first repeat unit represented by Formula 3 and a second repeat unit represented by Formula 4.

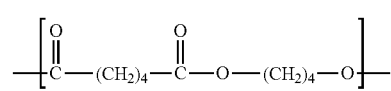

[Formula 3]

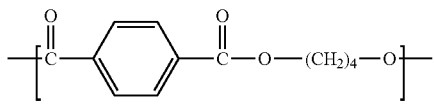

[Formula 4]

A molar ratio of the first repeat unit and the second repeat unit may be controlled by varying the amount of the aliphatic dicarboxylic acid and the amount of the aromatic dicarboxylic acid, which are reacted with the aliphatic dihydroxy compound as described above.

The molar ratio of the first repeat unit and the second repeat unit may be in the range of about 30:70 to about 99:1

In Formulas 1 and 2, the aliphatic hydrocarbon may be a $C_1$-$C_{30}$ alkylene group, a $C_5$-$C_{30}$ cycloalkylene group, or a $C_4$-$C_{30}$ cycloheteroalkylene group.

In Formula 2, the aromatic hydrocarbon may be a $C_6$-$C_{30}$ arylene group or a $C_5$-$C_{30}$ heteroarylene group.

Embodiments of the method of preparing a biodegradable aliphatic/aromatic polyester copolymer will now be described in more detail. A first esterification reaction may be continuously performed in an esterification reactor.

First, an aliphatic dihydroxy compound and an aliphatic dicarboxylic acid may be mixed in a first slurry tank to prepare a slurry.

A catalyst may be further added into the slurry.

[First Continuous Esterification Reaction]

The slurry obtained from the first slurry tank may be continuously added into a first esterification reactor to perform esterification reaction of the aliphatic dihydroxy compound and the aliphatic dicarboxylic acid, at a temperature of 185° C. or less, for example, a temperature in the range of about 160 to about 185° C. A flow rate of the slurry added into the first esterification reactor may be adjusted according to a size of the reactor to control a residence time of a reaction mixture in the reactor, but the flow rate is not limited to a specific range. For example, when a volume of the first esterification reactor is about 0.49 m³, the flow rate of the slurry may be in a range of about 20 to about 40 kg/h.

The catalyst may be further added into the first esterification reactor.

The pressure in the first esterification reactor may be controlled in a normal pressure range, and the term "normal pressure" used herein may refer to a range of about 760±10 torr.

The heat stabilizer may be further added into the reaction mixture.

A level of the reaction mixture (i.e., a quantity of the reaction mixture filled in the reactor) and a flow rate thereof may be adjusted such that a time spent by the reaction mixture in the first esterification reactor is from 2 hours to 6 hours.

Water produced as a byproduct from the esterification reaction may be removed through a condenser.

An acid value of the aliphatic oligomer obtained from the first esterification reaction may be less than 1 mg KOH/g or less, and for example, may be in a range of about 0.1 to about 1 mg KOH/g. A weight average molecular weight of the aliphatic oligomer may be in a range of about 300 to about 1,000.

The reaction mixture in the first esterification reactor may be continuously added into a second slurry tank at a flow rate from about 20 kg/h to about 40 kg/h. After adding the aromatic dicarboxylic acid into the second slurry tank, the mixture may be stirred.

As a reactor for the first esterification reaction, a reactor suitable for manufacturing an ester oligomer having a molecular weight within the above range, and flow characteristics corresponding to the molecular weight, for example, in terms of viscosity and melting index, may be used. Such reactors are widely known in the field of polyester polymer synthesis to which the present invention pertains. For example, a vertical-type reactor equipped with a stirrer having pitched paddle impellers (manufactured by Hado, Korea) may be used. The stirrer may form a resultant flow of a under flow and an axial flow to make an ideal flow pattern resulting in a high stirring effect (refer to http://www.hado.co.kr/default1.html).

[Second Esterification Reaction]

The slurry in the second slurry tank may be continuously added into a second esterification reactor to perform a second esterification reaction of the aliphatic oligomer and terephthalic acid at a temperature in a range of about 220 to about 250° C. The reaction pressure may be normal. When the second esterification reactor has a volume of about 0.4 m³, the flow rate may be from about 30 kg/h to about 45 kg/h.

Water produced from the ester reaction may be removed through a condenser.

To compensate for 1,4-butanediol (BDO) that is converted into tetrahydrofuran (THF) or lost by being distilled at a high temperature, an aliphatic dihydroxy compound such as pure BDO may be further continuously added into the second esterification reactor, for example, having a volume of about 0.4 m³ via a separate injection device at a flow rate in a range of about 0.1 to about 8 kg/h for reaction.

The residence time of the reaction mixture in the second esterification reactor may be adjusted to be from about 2 to about 6 hours by controlling the level and the flow rate of the reaction mixture.

According to the above-described embodiments of the preparation method, the amount of THF removed via the condenser may be reduced, and thus the amount of pure BDO added via an injection device may also be significantly reduced compared to conventional methods.

A reaction product resulting from the second esterification reaction may have an acid value from about 10 mg KOH/g to about 40 mg KOH/g and a weight average molecular weight from about 1,000 to about 5,000.

As a reactor for the second esterification, a reactor suitable for manufacturing an ester oligomer having a molecular weight within the above range, and flow characteristics corresponding to the molecular weight, for example, in terms of viscosity and melting index, may be used. Such reactors are widely known in the field of polyester polymer synthesis to which the present invention pertains. For example, the same type of reactor as that used in the first esterification reaction may be used.

[First Polycondensation Reaction]

The reaction product obtained from the second esterification reaction may be continuously added into the first polycondensation reactor, and then a first polycondensation (i.e., pre-polymerization) of the reaction product may be performed to obtain a prepolymer. The reaction temperature may be in a range of about 220 to about 250° C., and the degree of vacuum may be in a range of about 10 to about 50 torr.

At least one selected from a catalyst and a heat stabilizer may be further added into the reactor to catalyze the reaction.

A level of the reaction mixture (i.e., a quantity of the reaction mixture filled in the reactor) and a flow rate thereof may be adjusted such that a time spent by the reaction mixture in the first polycondensation reactor is 1 to 4 hours.

The prepolymer as the reaction product from the first polycondensation reaction may have an acid value from about 5 mg KOH/g to about 10 mg KOH/g and a weight average molecular weight from about 6,900 to about 14,000. Using the prepolymer having a weight average molecular weight within this range, the resulting biodegradable aliphatic/aromatic polyester copolymer may be improved in processibility, film formability, tensile/tearing strength, and blending ability with another polymer resin.

As a reactor for the first polycondensation reaction, a reactor suitable for manufacturing a prepolymer having a molecular weight within the above range and viscosity corresponding to the molecular weight may be used. Such reactors are widely known in the field of polyester polymer synthesis to which the present invention pertains. For example, a vertical-type reactor (manufactured by Hitachi Plant Technology) equipped with an anchor-type stirrer may be used. When the first polycondensation reactor has a volume of about 0.4 m$^3$, the flow rate may be in the range of about 20 kg/h to about 50 kg/h.

To control the weight average molecular weights of the reaction products from the second polycondensation reaction and the third polycondensation reaction, reaction conditions for these reactions, for example, in terms of reaction mixture residence time (i.e., the time spend by each reaction mixture in the corresponding reactor), reaction temperature, and degree of vacuum, are very important.

[Second Polycondensation Reaction]

The prepolymer obtained from the first polycondensation reaction may be continuously added into the second polycondensation reactor, and then a second polycondensation reaction of the prepolymer may be performed at a temperature of about 220 to about 250° C. The degree of vacuum may be in the range of about 2 to about 7 torr, and the residence time of the reaction mixture may be adjusted to be in the range of about 1.5 to about 3 hours by controlling the level of the reaction mixture (i.e., a quantity of the reaction mixture filled in the reactor) and the flow rate thereof.

The reaction product from the second polycondensation reaction may have an acid value in a range of about 3 to 8 mg KOH/g, a weight average molecular weight in a range of about 50,000 to about 80,000, a melting index in a range of about 15 to about 25 g/10 min, and an intrinsic viscosity in a range of about 0.9 to about 1.0 dl/g. Using the reaction product from the second polycondensation reaction having a weight average molecular weight within this range, the resulting biodegradable aliphatic/aromatic polyester copolymer may be improved in biodegradable aliphatic/aromatic polyester copolymer.

As a reactor for the second polycondensation reaction, a reactor suitable for manufacturing a prepolymer having a molecular weight within the above range, and flow characteristics corresponding to the molecular weight, for example, in terms of viscosity and melting index, may be used. Such reactors are widely known in the field of polyester polymer synthesis to which the present invention pertains. For example, a horizontal-type reactor (manufactured by Hitachi Plant Technology) equipped with a horizontally arranged single stirrer may be used. When the second polycondensation horizontal-type reactor has a volume of about 0.24 m$^3$, the flow rate may be in a range of about 20 to about 40 kg/h, and the number of revolutions of the stirrer may be in a range of about 1.5 to about 8 rpm.

[Third Polycondensation Reaction]

The reaction product obtained from the second polycondensation reaction may be continuously added into the third polycondensation reactor, and then a third polycondensation reaction may be performed at a temperature of about 220 to about 250° C. In this regard, the degree of vacuum may be in the range of about 0.5 to about 2 torr.

A level of the reaction mixture (i.e., a quantity of the reaction mixture filled in the reactor) and the flow rate thereof may be adjusted such that a time spent by the reaction mixture in the third polycondensation reactor is 1 to 3 hours.

A final polymer after completion of the reaction may be passed through a cooling water bath to be cooled down to solidify, cut into a desired form with a cutter, dried, and then transferred into a silo, thereby resulting in a target biodegradable aliphatic polyester. In some embodiments, the final polymer may be solidified with cool water in an under-water pelletizer prior to the cutting.

The polyester copolymer may have an acid value from about 1.5 to about 6 mg KOH/g, a weight average molecular weight from about 120,000 to about 170,000, for example, from about 130,000 to about 160,000, an intrinsic viscosity from about 1.4 to about 1.9 dl/g, and a melting index from about 2 g to about 4 g per 10 minutes.

As a reactor for the third polycondensation reaction, a reactor suitable for manufacturing a prepolymer having a molecular weight within the above range, and flow characteristics corresponding to the molecular weight, for example, in terms of viscosity and melting index, may be used. Such reactors are widely known in the field of polyester polymer synthesis to which the present invention pertains. For example, a horizontal-type polycondensation reactor (manufactured by Hitachi Plant Technology) equipped with two horizontally arranged stirrers may be used. In some embodiments, the third horizontal-type polycondensation reactor of the Hitachi Plant Technology may have two spectacle-shaped blades horizontally arranged parallel to each other. Here, a blade connected to each rotation axis passes through between the blade and another blade of another rotation axis to widen a surface area of high viscosity reaction mixture and induce an efficient reaction (refer to http://www.hitachi-pt.com/products/ip/element technology/simulation.html).

When the third polycondensation reactor has a volume of about 0.192 m$^3$, the flow rate may be from about 20 kg/h to about 40 kg/h, and the number of revolutions of the stirrer may be from about 5 rpm to about 8 rpm.

During the first, second, and third polycondensation reactions, a color stabilizing agent may be further added into each of the reactors for the polycondensation reactions.

Examples of the color stabilizing agent may be phosphoric acid, phosphorous acid, triphenyl phosphite, triphenyl phosphate, sodium hypophosphite, and sodium phosphonate.

Hereinafter, a method of preparing a biodegradable aliphatic/aromatic polyester copolymer according to another embodiment of the present invention will now be described in more detail.

According to another embodiment of the present invention, a first esterification reaction may be performed in a batch reactor, unlike the methods according to the above-described embodiments. This method will be described in detail below.

In the batch reactor, esterification reaction of an aliphatic dihydroxy compound and aliphatic dicarboxylic acid may be performed at a temperature of 185° C. or less to obtain an aliphatic oligomer.

The esterification reaction may be performed in the presence of a catalyst.

Water produced by the esterification reaction may be removed through a condenser, and a heat stabilizer may be further added into the batch reactor.

The aliphatic oligomer may be stored in a storage tank.

The aliphatic oligomer in the storage tank and the aromatic dicarboxylic acid may be supplied into a first slurry tank. In this regard, the aromatic dicarboxylic acid may be quantified in a hopper and put into the first slurry tank. The aliphatic oligomer may be stirred while the internal temperature of the first slurry tank is maintained in a range from about 70 to about 80° C.

In some other embodiments, the aromatic dicarboxylic acid may not be supplied into the first slurry tank. Instead, the aromatic dicarboxylic acid may be added into the reactor during the esterification reaction of the aliphatic dihydroxy compound and aliphatic dicarboxylic acid.

The slurry obtained in the first slurry tank may be continuously flowed into the second slurry tank. An internal temperature of the second slurry tank may be maintained in a range from about 70 to about 80° C. to ensure continuous supply of the slurry into the second esterification reactor at a stable flow rate.

While the slurry manufactured in the second slurry tank is continuously input into the second esterification reactor, the second esterification reaction of the aliphatic oligomer and the aromatic dicarboxylic acid may be performed. A description of the subsequent reactions, which are the same as in the above-described embodiments, will be omitted here.

According to an embodiment, the biodegradable aliphatic/aromatic polyester copolymer may be used as a film, a sheet, a fiber, or other molded material.

One or more embodiments of the present invention will now be described in detail with reference to the following examples. However, these examples are not intended to limit the scope of the one or more embodiments of the present invention.

Test Method

First, the intrinsic viscosities, acid values, and weight average molecular weights of the reaction products obtained in each step of Examples 1 to 5 below were evaluated as follows.

(1) Weight Average Molecular Weight

The weight average molecular weight was measured by gel permeation chromatography (GPC, manufactured by Agilent HP 1100), and polystyrene was used as a standard material. A column was prepared by continuously connecting a PLgel (5 um) Mixed-D (manufactured by Phenomenex Company) and a PLgel (10 um) Mixed-B. The measurement was performed under conditions in which a temperature of the column and the detector was 35° C. and the flow rate was 1 ml/min.

(2) Intrinsic Viscosity (I.V.)

Phenol and 1,2-dichlorobenzene were mixed in a weight ratio of about 5:5 to prepare a reagent. 0.25 g of pellets (sample) was put into 25 mL of the reagent and completely dissolved at about 80° C. to obtain a solution, which was transferred into a Ubbelohde viscosity and then kept in a 25° C. thermostatic bath for about 10 minutes, followed by counting drop seconds of the solution with a viscometer and an aspirator. Drop seconds of the solvent were counted in the same method. A relative viscosity (R.V) and an intrinsic viscosity (I.V) of the solution were callused using Equations 1 and 2 below, where C indicates a concentration of a sample.

$$R.V.=\text{Drop seconds of sample}/\text{Drop seconds of solvent} \quad \text{[Equation 1]}$$

$$I.V.=1/4(R.V.-1)/C+3/4(\ln R.V/C) \quad \text{[Equation 2]}$$

(3) Acid Value

The acid value was measured according to DIN EN 12634, and the solvent was a mixture of 10 parts by volume of N,N-dimethylsulfoxide, 8 parts by volume of propane-2-ol, and 7 parts by volume of toluene.

A sample was heated to a temperature of 50° C., a single-rod electrode was used in a circuit, and a container containing the sample was filled with potassium chloride. A standard solution used herein was tetramethyl ammonium hydroxide (TMAH).

Example 1

Preparation of Biodegradable poly(butylene adipate-co-terephthalate) (PBAT)

[First Slurry Tank]

1,4-butanediol and adipic acid were put into a first slurry tank in a molar ratio of 1.3:0.52, stirred at a temperature of 70° C., and mixed to prepare a slurry.

[First Esterification Reaction]

The slurry from the first slurry tank was continuously put into a first esterification reactor for first esterification reaction of 1,4-butanediol and adipic acid. The flow rate was about 35 kg/h, the reaction temperature was 180° C., and the pressure was normal.

A vertical-type reactor equipped with a stirrer having pitched paddle impellers (manufactured by Hado, Ltd., Korea) was used as the first esterification reactor for the first esterification reaction (refer to http://www.hado.co.kr/default1.html). Triphenyl phosphate and tetra-n-butyl titanate were added into a reaction mixture in the first esterification reactor.

Triphenyl phosphate and tetra-n-butyl titanate were each pre-mixed with 1,4-butanediol to a concentration of 10% by weight and were continuously added into the first esterification reactor. The flow rate was controlled to use 0.1 g ($3.06 \times 10^{-4}$ mol) of triphenyl phosphate and 0.3 g ($8.815 \times 10^{-4}$ mol) of adipic acid, each per 0.52 moles of the adipic acid.

Water produced from the esterification reaction was removed through a condenser.

A level of the reaction mixture, i.e., a quantity of the reaction mixture filled in the reactor, was adjusted such that a time spent by the reaction mixture in the first esterification reactor was 3 hours.

A reaction product from the first esterification reaction had an acid value of about 1 mg KOH/g, and a weight average molecular weight of about 800.

[Second Slurry Tank]

The reaction mixture from the first esterification reactor was continuously put into a second slurry tank at a flow rate of about 30 kg/h, followed by adding terephthalic acid thereinto and mixing together with stirring to prepare a slurry. A final molar ratio of 1,4-butanediol, adipic acid, and terephthalic acid in the reaction slurry was adjusted to about 1.3:0.52:0.48.

[Second Esterification Reaction]

The slurry from the second slurry tank was continuously put into a second esterification reactor for second esterification reaction of an aliphatic oligomer as a product from the first esterification reaction with terephthalic acid. The flow rate was 40 kg/h, the reaction temperature was 230° C., and the pressure was normal.

The same reactor as used in the first esterification reaction was used for the second esterification reaction.

Water produced from the second esterification reaction was removed through a condenser, followed by continuously adding pure 1,4-butanediol into the reactor at a flow rate of 2 kg/h for reaction. A level of the reaction mixture, i.e., a quantity of the reaction mixture filled in the reactor, was adjusted such that a time spent by the reaction mixture in the reactor was to 3.5 hours.

A reaction product from the second esterification reaction had an acid value of about 20 mg KOH/g, and a weight average molecular weight of about 2,000.

[First Polycondensation Reaction]

The reaction product from the second esterification reaction was continuously put into a first polycondensation reactor for first polycondensation (referred to as pre-polymerization) to obtain a pre-polymer. The flow rate was 35 kg/h, the reaction temperature was 240° C., and the degree of vacuum was 20 torr.

A vertical-type reactor (manufactured by Hitachi Plant Technology) equipped with an anchor-type stirrer was used as the first polycondensation reactor.

Tetra-n-butyl titanate as a catalyst was pre-mixed with 1,4-butanediol to a concentration of 10% by weight, and was continuously added into the first polycondensation reactor. The flow rate was adjusted to use 0.3 g ($8.815 \times 10^{-4}$ mol) of tetra-n-butyl titanate per 0.52 moles of adipic acid.

A level of the reaction mixture, i.e., a quantity of the reaction mixture filled in the reactor, was adjusted such that a time spent by the reaction mixture in the reactor was 2 hours.

A reaction product form the first polycondensation reaction had an acid value of about 7 mg KOH/g.

[Second Polycondensation Reaction]

The reaction product from the first polycondensation reaction was continuously put into a second polycondensation reactor for second polycondensation reaction. The flow rate was 35 kg/h, the reaction temperature was 240° C., and the degree of vacuum was 6 torr. A level of the reaction mixture, i.e., a quantity of the reaction mixture filled in the reactor, was adjusted such that a time spent by the reaction mixture in the reactor was 2 hours. A horizontal-type reactor (manufactured by Hitachi Plant Technology) equipped with a horizontally arranged single stirrer was used as the second polycondensation reactor. The number of revolutions of the single stirrer was about 5 rpm. The reaction product from the second polycondensation reaction had an acid value of about 5 mg KOH/g.

[Third Polycondensation Reaction]

The reaction product from the second polycondensation reaction was continuously put into a third polycondensation reactor for third polycondensation reaction. The flow rate was 35 kg/h, the reaction temperature was 240° C., and the degree of vacuum was 1 torr.

A horizontal-type reactor (manufactured by Hitachi Plant Technology) equipped with two horizontally arranged stirrers was used as the third polycondensation reactor. The number of revolutions of the single stirrer was about 5 rpm.

A level of the reaction mixture, i.e., a quantity of the reaction mixture filled in the reactor, was adjusted such that a time spent by the reaction mixture in the third polycondensation reactor was 1.5 hours.

A final polymer after completion of the third polycondensation reaction was cooled down by being passed through a cooling water bath to solidify. Then, the final polymer was cut with a cutter and dried to obtain poly(butylene adipate-co-terephthalate) (PBAT) as a target biodegradable polyester copolymer including a repeat unit of 1,4-butylene-adipate and another repeat unit of 1,4-butylene terephthalate.

The resulting PBAT had an acid value of about 2.5 mg KOH/g.

The same reactors as the first esterification reactor, the second esterification reactor, the first polycondensation reactor, the second polycondensation reactor, and the third polycondensation reactor used in Example 1 were used in Examples 2 to 5, which will be described below.

Example 2

Preparation of Biodegradable PBAT

[First Esterification Reaction]

1,4-butanediol and adipic acid were put into a batch reactor in a molar ratio of 1.3:0.52, followed by esterification reaction at a temperature of 180° C. at an atmospheric pressure to obtain bishydroxy butylene adipate (hereinafter, referred to as BHBA), which was stored in a storage tank.

Water produced from the first esterification reaction was removed through a condenser, followed by continuously adding triphenyl phosphate and tetra-n-butyl titanate into a batch reactor for esterification reaction of 1,4-butanediol with adipic acid. Triphenyl phosphate and tetra-n-butyl titanate were each pre-mixed with 1,4-butanediol to a concentration of 10% by weight prior to the continuous adding into the batch reactor. The amounts of triphenyl phosphate and tetra-n-butyl titanate were about 0.1 g and about 0.3 g, respectively, each per 0.52 mol of adipic acid.

The reaction product from the first esterification reaction had an acid value of about 1 mg KOH/g and a weight average molecular weight of about 700.

The BHBA prepared in the batch reactor was mixed with terephthalic acid in the first slurry tank to prepare a slurry. The terephthalic acid was quantified in a hopper, added into the first slurry tank, and then stirred while maintaining temperature at about 70° C. to 80° C. A molar ratio of 1,4-butanediol, adipic acid, and terephthalic acid was adjusted to be 1.3:0.52:0.48.

The slurry prepared in the first slurry tank was continuously flowed into the second slurry tank of which temperature was maintained at about 75° C.

[Second Esterification Reaction]

The slurry prepared in the second slurry tank was continuously added into the second esterification reactor to react BHBA with terephthalic acid. The flow rate of the slurry was 40 kg/h, the reaction temperature was 230° C., and the pressure was normal.

Water produced from the second esterification reaction and THF generated from a side reaction of 1,4-butanediol were removed through a condenser. Pure 1,4-butanediol was continuously added into the second esterification reactor via an injection device at a flow rate of about 2.5 kg/h for reaction. A level of the reaction mixture, i.e., a quantity of the reaction mixture filled in the reactor, was adjusted such that a time spent by the reaction mixture in the second esterification reactor was 3.5 hours.

The reaction product from the second esterification reaction was about 20 mg KOH/g and a weight average molecular weight of about 2,000.

[First Polycondensation Reaction]

The reaction product from the second esterification reaction was continuously added into the first polycondensation reactor for first polycondensation (referred to as pre-polymerization). The flow rate of the reaction product was 35 kg/h, the reaction temperature was 240° C., and the degree of vacuum was 20 torr.

Tetra-n-butyl titanate was pre-mixed with 1,4-butanediol to a concentration of 10% by weight, and then continuously added into the first polycondensation reactor via an injection device at a flow rate of 0.84 kg/h. A level of the reaction mixture was adjusted such that a time spent by the reaction mixture in the first polycondensation reactor was 2 hours.

The reaction product from the first polycondensation reaction had an acid value of about 7 mg KOH/g.

[Second Polycondensation Reaction]

The reaction product, i.e., pre-polymer, from the first polycondensation reaction was continuously added into the second polycondensation reactor for second polycondensation reaction. The flow rate of the pre-polymer was 35 kg/h, the reaction temperature was 240° C., and the degree of vacuum was 6 torr.

A level of the reaction mixture, i.e., a quantity of the reaction mixture filled in the reactor, was adjusted such that a time spent by the reaction mixture in the second polycondensation reactor was 2 hours.

The reaction product from the second polycondensation reaction had an acid value of about 4.2 mg KOH/g.

[Third Polycondensation Reaction]

The reaction product from the second polycondensation reaction was continuously added into the third polycondensation reactor for third polycondensation reaction. The flow rate of the reaction product was 35 kg/h, the reaction temperature was 240° C., and the degree of vacuum was about 1 torr.

A level of the reaction mixture, i.e., a quantity of the reaction mixture filled in the reactor, was adjusted such that a time spent by the reaction mixture in the third polycondensation reactor was 1.5 hours. A final polymer after completion of the third polycondensation reaction was cooled down by being passed through a cooling water bath to solidify. The final polymer was cut with a cutter and dried to obtain biodegradable polybutylene adipate-co-terephthalate (PBAT).

The PBAT had an acid value of about 2.7 mg KOH/g.

Example 3

Preparation of Biodegradable PBAT

[First Slurry Tank]

1,4-butanediol, adipic acid, and terephthalic acid were put into the first slurry tank in a molar ratio of 1.3:0.52:0.48, stirred and mixed together at a temperature of 60° C. to prepare a slurry.

[First Esterification]

The slurry from the first slurry tank was continuously put into the first esterification reactor for first esterification reaction. The flow rate of the slurry was 48 kg/h, the reaction temperature was 180° C., and the pressure was normal.

Triphenyl phosphate and tetra-n-butyl titanate were added into the reaction mixture in the first esterification reactor to perform esterification reaction.

Triphenyl phosphate and tetra-n-butyl titanate were each pre-mixed with 1,4-butanediol to a concentration of 10% by weight, and were continuously added into the first esterification reactor. The flow rate of the reaction mixture was adjusted to use 0.1 g ($2.94 \times 10^{-4}$ mol) of tetra-n-butyl titanate and 0.3 g ($9.195 \times 10^{-4}$ mol) of triphenyl phosphate, each per 0.52 mol of adipic acid.

Water produced from the first esterification reaction was removed through a condenser.

[Second Esterification Reaction]

The reaction product from the first esterification reaction was continuously added into the second esterification reactor to react the reaction product with terephthalic acid. The flow rate of the reaction product was 40 kg/h, the reaction temperature was 230° C., and the pressure was normal.

Water produced from the second esterification reaction was removed through a condenser, followed by continuously adding pure 1,4-butanediol into the second esterification reactor at a flow rate of 2.5 kg/h for reaction. A level of the reaction mixture, i.e., a quantity of the reaction mixture filled in the reactor, was adjusted such that a time spent by the reaction mixture in the second esterification reactor was 3.5 hours.

The first polycondensation reaction, the second polycondensation reaction, and the third polycondensation reaction were performed in the same manner as Example 1 to obtain a target PBAT as a biodegradable polyester.

The PBAT had an acid value of about 2.1 mg KOH/g.

Example 4

Preparation of Biodegradable PBAT

PBAT as a biodegradable polyester was obtained in the same manner as Example 1, except that the first esterification reaction was performed at a temperature of 160° C., and a level of the reaction mixture, i.e., a quantity of the reaction mixture spent in the reactor, was adjusted such that a time spent by the reaction mixture in the first esterification reactor was 6 hours.

Example 5

Preparation of Biodegradable PBAT

PBAT as a biodegradable polyester was obtained in the same manner as Example 1, except that the first esterification reaction was performed at a temperature of 185° C., and a level of the reaction mixture, i.e., a quantity of the reaction mixture filled in the reactor, was adjusted such that a time spent by the reaction mixture in the first esterification reactor was 2.5 hours.

Reference Example 1

Preparation of Biodegradable PBAT

PBAT as a biodegradable polyester was obtained in the same manner as in Example 1, except that a level of the reaction mixture for the first polycondensation reaction, i.e., a quantity of the reaction mixture filled in the first polycondensation reactor, was adjusted such that a time spent by the reaction mixture in the first polycondensation reactor was about 4 hours, and a level of the reaction mixture for the second polycondensation reaction, i.e., a quantity of the reaction mixture filled in the second polymer condensation reactor, was adjusted such that a time spent by the reaction mixture in the second polycondensation reactor was about 3.5 hours.

Reference Example 2

Preparation of Biodegradable PBAT

PBAT as a biodegradable polyester was obtained in the same manner as in Example 1, except that a level of the reaction mixture for the first polycondensation reaction, i.e., a quantity of the reaction mixture filled in the first polycondensation reactor, was adjusted such that a time spent by the reaction mixture in the first polycondensation reactor was about 1 hour, and a level of the reaction mixture for the second polycondensation reaction, i.e., a quantity of the reaction mixture filled in the second polymer condensation reactor, was adjusted such that a time spent by the reaction mixture in the second polycondensation reactor was about 1 hour.

Evaluation Example 1

Weight Average Molecular Weight

Weight average molecular weights of the first polycondensation reaction products, the second polycondensation reaction products, and the third polycondensation reaction products (biodegradable PBATs) of Examples 1 to 4 and Reference Examples 1 and 2 were evaluated. The evaluation results are shown in Table 1 below.

TABLE 1

| Example | Weight average molecular weight of first polycondensation reaction product | Weight average molecular weight of second polycondensation reaction product | Weight average molecular weight of third polycondensation reaction product |
|---|---|---|---|
| Example 1 | 14,000 | 80,000 | 170,000 |
| Example 2 | 9,500 | 76,000 | 155,000 |
| Example 3 | 6,900 | 50,000 | 145,000 |
| Example 4 | 7,700 | 72,000 | 150,000 |
| Example 5 | 12,000 | 75,000 | 160,000 |
| Reference Example 1 | 16,000 | 120,000 | 100,000 |
| Reference Example 2 | 4,300 | 45,000 | 98,000 |

Referring to Table 1, the first polycondensation reaction products in Examples 1 to 5 are found to have a weight average molecular weight from about 6,900 to about 14,000, which consequently lead to the production of the second polycondensation reaction products having a weight average molecular weight from about 50,000 to about 80,000 and the biodegradable PBATs having a weight average molecular weight from about 120,000 to about 170,000. Meanwhile, the third polycondensation reaction product in Reference Example 1 is found to have a smaller weight average molecular weight than the second polycondensation reaction product due to depolymerization. The first polycondensation reaction product in Reference Example 2 is found to have a weight average molecular weight too small to produce a second polycondensation reaction product and a biodegradable PBAT (third polycondensation reaction) having a satisfactory large weight average molecular weight.

Evaluation Example 2

Comparison of Amount of 1,4-Butanediol with that of Dicarboxylic Acid

The amounts of 1,4-butanediol used in preparing biodegradable PBATs in Examples 1 to 3 were compared to each other. The results are shown in Table 2 below.

TABLE 2

| Example | Moles of 1,4-butanediol based on 1 mol of dicarboxylic acid (mol) |
|---|---|
| Example 1 | 1.45 |
| Example 2 | 1.48 |
| Example 3 | 1.48 |
| Comparative Example 1* | 2.18 |

*The amount of 1,4-butanediol used in Comparative Example 1, provided for comparison with Examples 1 to 3, was calculated based on a molar ratio disclosed in Example 1 of Korean Publication No. 10-2011-007186.

The amounts of 1,4-butanediol used for esterification in Examples 1 to 3 are found to be less than that used in Comparative Example 1. This indicates that conversion reaction of 1,4-butanediol into THF was suppressed during the esterification in Examples 1 to 3.

Evaluation Example 3

Comparison of Generated Amount of THF

The amounts of THF generated during the second esterification reaction of Examples 1 to 5 were measured per 1 mole of dicarboxylic acid (as a total amount of adipic acid and terephthalic acid. The results are shown in Table 3 below.

TABLE 3

| Example | Generated amount of THF based on 1 mole of dicarboxylic acid (mol) |
|---|---|
| Example 1 | 0.17 |
| Example 2 | 0.22 |
| Example 3 | 0.18 |
| Example 4 | 0.15 |
| Example 5 | 0.25 |
| Comparative Example 2* | 1.09 |

*The amount of THF generated in Comparative Example 2, provided for comparison with Examples 1 to 5, was calculated after an esterification reaction in a 3-necked glass flask in the same molar ratio of monomers and at the same reaction temperature as those in Example 1 disclosed in Korean Publication No. 10-2011-007186.

Referring to Table 3, the amounts of generated THFs in Examples 1 to 5 were significantly lower than that of Comparative Example 2.

Evaluation Example 4

Color Comparison

Colors of the biodegradable PBATs prepared in Examples 1 to 3 and Reference Examples 1 and 2 were measured using a colorimeter (SpectraMagic NXKonica Minolta) to obtain L-values and b-values and evaluate color characteristics. The results are shown in Table 4 below.

The nearer to 100, the L value as a whitening value indicates pure white.

The b value, which is related with yellow and blue colors, indicates yellow when it is a (+) value, and blue when it is a (−) value. Accordingly, the larger the L value, the brighter the color, and the nearer to 0 the b value is, the better the color characteristics.

TABLE 4

| Example | Color (L*/b*) |
|---|---|
| Example 1 | 83.08/5.02 |
| Example 2 | 84.35/4.13 |

TABLE 4-continued

| Example | Color (L*/b*) |
| --- | --- |
| Example 3 | 82.35/4.22 |
| Reference Example 1 | 74.32/12.18 |
| Reference Example 2 | 85.18/4.24 |

Referring to Table 4, the biodegradable PBAT of Reference Example 1 is found to have a remarkably larger b value than those of the biodegradable PBATs of Examples 1 to 3, indicating that color characteristics of the biodegradable PBAT of Reference Example 1 were deteriorated due to depolymerization by heat. Meanwhile, the biodegradable PABT of Reference Example 2 was not significantly different in color characteristics from the biodegradable PABTs of Examples 1 to 3, since the second polycondensation reaction and third polycondensation reaction in Reference Example 2 were not sufficiently performed as a cause of color changes. However, as described above in Evaluation Example 1, the weight average molecular weights of the second polycondensation reaction product and the biodegradable PABT prepared in Reference Example 2 were too small than they should be for intended uses.

While the present invention has been particularly shown and described with reference to exemplary embodiments thereof, it will be understood by those of ordinary skill in the art that various changes in form and details may be made therein without departing from the spirit and scope of the present invention as defined by the following claims.

The invention claimed is:

1. A continuous preparation method of a biodegradable aliphatic/aromatic polyester copolymer, the method comprising:
performing a first esterification reaction of an aliphatic dihydroxy compound with an aliphatic dicarboxylic acid at a temperature of about 160° C. to about 185° C. or less;
continuously performing a second esterification reaction of a reaction product from the first esterification reaction at a temperature of about 220° C. to about 250° C.;
continuously performing a first polycondensation reaction of a reaction product from the second esterification reaction to obtain a prepolymer having a weight average molecular weight of about 6,900 to about 14,000;
continuously performing a second polycondensation reaction of the prepolymer to obtain a second polycondensation reaction product; and
continuously performing a third polycondensation reaction of the second polycondensation reaction product to prepare the biodegradable aliphatic/aromatic polyester copolymer,
wherein the performing of the first esterification reaction or the continuously performing of the second esterification reaction comprises adding an aromatic carboxylic acid.

2. The continuous preparation method of claim 1, wherein the polycondensation reaction product has a weight average molecular weight of about 50,000 to about 80,000.

3. The continuous preparation method of claim 1, wherein the biodegradable aliphatic/aromatic polyester copolymer obtained from the third polycondensation reaction has a weight average molecular weight of about 120,000 to about 170,000.

4. The continuous preparation method of claim 1, wherein the first polycondensation reaction is performed at a temperature of about 220° C. to about 250° C., a degree of vacuum of about 10 torr to about 50 torr, and a reaction mixture residence time of about 1.5 hours to about 3 hours.

5. The continuous preparation method of claim 1, wherein an amount of the aliphatic dihydroxy compound is in a range of about 1.1 moles to about 1.5 moles based on 1 mole of a total amount of the aliphatic dicarboxylic acid and the aromatic dicarboxylic acid.

6. The continuous preparation method of claim 1, wherein the second polycondensation reaction is performed at a temperature of about 220° C. to about 250° C., a degree of vacuum of about 2 torr to about 7 torr, and a reaction mixture residence time of about 1.5 hours to 3 hours.

7. The continuous preparation method of claim 1, wherein the third polycondensation reaction is performed at a temperature of about 220° C. to about 250° C., a degree of vacuum of about 0.5 torr to about 2 torr, and a reaction mixture residence time of about 1 hour to 3 hours.

8. The continuous preparation method of claim 1, wherein the first esterification reaction is performed in a batch reactor or is continuously performed in an esterification reactor.

9. The continuous preparation method of claim 1, wherein the performing of the first esterification reaction of the aliphatic dihydroxy compound with the aliphatic dicarboxylic acid comprises adding at least one selected from a catalyst, a heat stabilizer, a branching agent, a color stabilizing agent, and a color control agent.

10. The continuous preparation method of claim 1, wherein the continuously performing of the first polycondensation reaction comprises adding a catalyst.

* * * * *